Jan. 20, 1970   H. HEYMANN   3,490,838
OPTICAL SYMBOL DISPLAY APPARATUS
Filed March 21, 1967   2 Sheets-Sheet 1

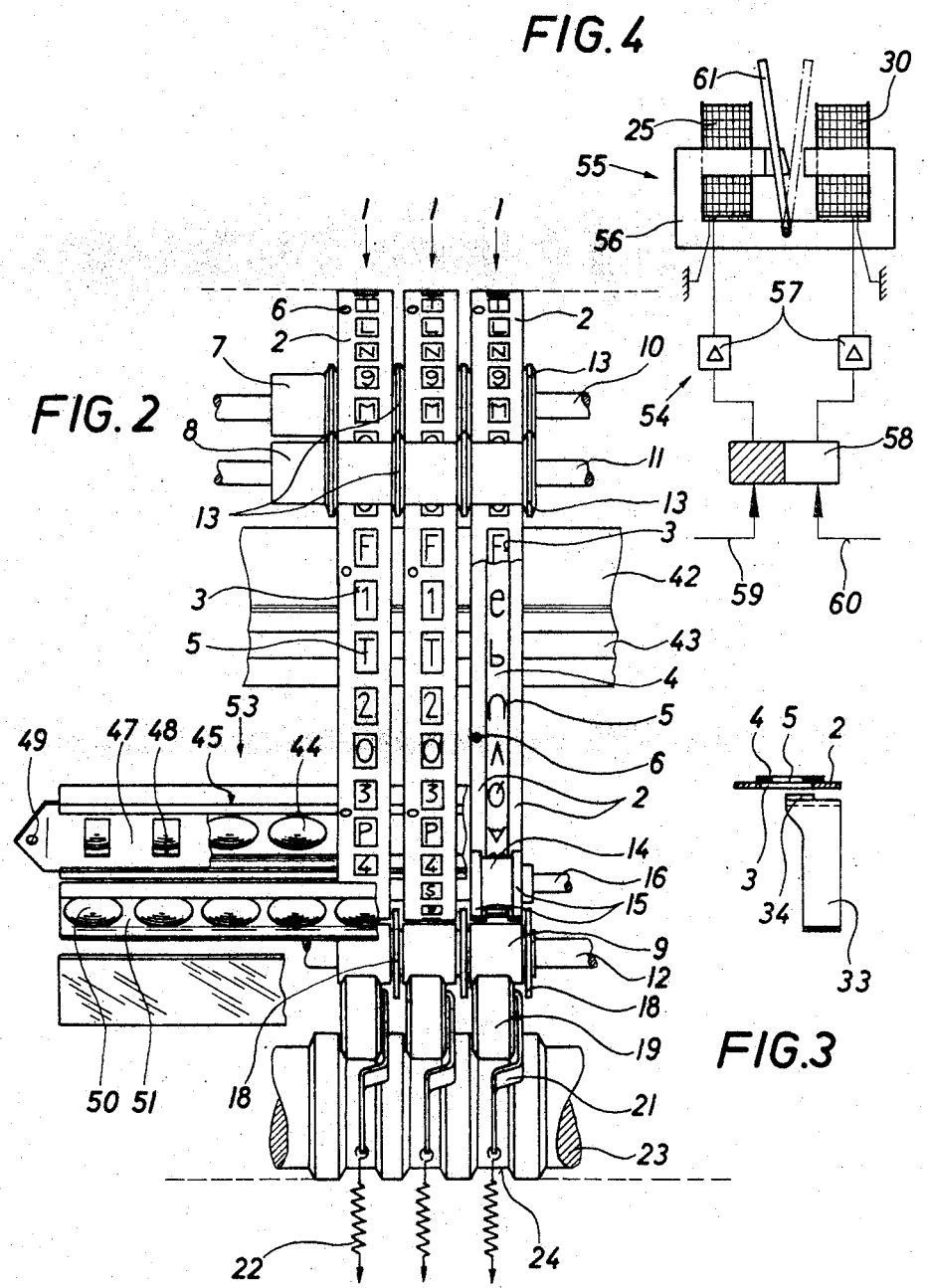

United States Patent Office 3,490,838
Patented Jan. 20, 1970

3,490,838
OPTICAL SYMBOL DISPLAY APPARATUS
Hans Heymann, Wilhelmshaven, Germany, assignor to Olympia Werke A.G., Roffhausen, near Wilhelmshaven, Germany, a corporation of Germany
Filed Mar. 21, 1967, Ser. No. 624,939
Claims priority, application Germany, Mar. 30, 1966, O 11,551
Int. Cl. G03b 23/06
U.S. Cl. 353—107                      20 Claims

ABSTRACT OF THE DISCLOSURE

Symbols are transparently arranged on the convex surface of revolving, cylindrically-shaped symbol carriers inside which a light source has been installed. Each symbol carrier, designed in the form of a thin walled hollow cylinder, rests on free-running rollers, one of which functions as a driving roller. The free-running rollers may be located on either the outer surface or the inner surface of the cylinder.

BACKGROUND OF THE INVENTION

The present invention relates to an optical symbol display apparatus for displaying alphanumeric symbols in connection with data processing machines, and more particularly, to optical symbol display apparatus that are not slow and that are of inertialess operation.

The use of mechanical symbol devices is known. In some of these number wheels are used which have a white background cylinder surface with numbers or figures of another color, preferably black. The slowness of such mechanical devices is a disadvantage. Furthermore, the manufacturing of the wheels themselves is complicated. The drive of the wheels is also relatively slow and troublesome. It consists of numerous, somewhat complicatedly-shaped units.

It is known, for example in connection with electronically functioning data processing machines, how to provide symbol display devices of inertialess operation. These consist of display tubes which are adjustable by output signals supplied by the electronic machine. It is a disadvantage that the control of such display tubes is relatively expensive.

Also known in the prior art is an optical display device in which a pair of annular picture frames or carriers lying next to each other are driven individually by a special spring movement. The individual pictures are successively arranged on the annular circumference of the picture carriers. The picture carriers are connected to gear rims which are rotated by pinions. The picture carriers are mounted on roller bearings, which also guarantee their turning along an exact track. Inside the picture carriers a light source has been devised, which, together with a reflector and an optical system, provides the light for the transparencies. (See, for example, U.S. Patent 2,289,812.) Such a device is not suitable for use with data processing machines, as it is extraordinarily slow and cannot provide at all the required rapidity of speed adjustment.

A further known electrically-controlled symbol selection device has circular drums, on the outer circumferences of which are placed one or more sets of the symbols to be displayed. The drums are placed in a sliding seat on a continuously rotating shaft. Clutch devices for stopping the drums are provided, to brake one drum at a time. These clutch means contain electromagnets, which are situated radially inside the drum. When a selected electromagnet is activated, the drum is braked and it remains in a stopped position while the drive shaft continues to revolve. (See, for example, British Patent No. 775,927.) Such a symbol device also is unsuitable for use with fast data processing machines. The large number of braking magnets required makes the machine expensive and excessively heavy.

SUMMARY OF THE INVENTION

It is one object of the invention to overcome the disadvantages of known optical symbol display devices that are not slow and to obtain this result with an extremely simple and reliable construction.

Another object of the invention is to provide a symbol display apparatus which can be constructed to be extraordinarily light and inertialess.

Another object of the invention is to provide a symbol display apparatus which ensures short quick symbol positioning with relatively small symbol positioning forces.

Another object of the invention is to provide a symbol display apparatus which advantageously may be used in connection with electronic calculating machines for the display of alphanumerical data.

With these objects in view, an embodiment of the invention comprises cylindrically shaped symbol carries inside which a light source is provided, each carrier is desinged as a thin-walled hollow cylinder. Each carrier is supported on free-running rollers. One of said rollers acts as a driving roller to transmit a selective rotary input via a free-running idler roller to said symbol carrier.

In a further embodiment of the invention, a driven roller lies spaced at a certain distance opposite a continuously rotating drive shaft and can be coupled to the same by means of a controllable clutch for selectable time periods.

In accordance with the invention each controllable clutch includes a coupling roller which may be activated by means of a clutch magnet. Because of the extremely light construction of the symbol carrier rotation of the carrier can be obtained practically immediately after energization of the clutch magnet. A braking device is provided to stop the symbol carrier at desired times.

In a preferred embodiment of the invention several symbol carriers are laterally to each other, arranged in a mutually aligned serial order. In such an arrangement, a coupling device, a braking device, one set of free-running rollers and a drive roller are provided for each symbol carrier.

The skillful construction of the parts allows the free-running and the driving rollers, as well as the elements of the clutches and brakes to be placed next to each other. The free-running and the drive rollers are rotatably mounted adjacent each other on frame-fitted stationary shafts, while disks are strung between them, which serve as spacer disks. For the purpose of the guiding of the coupling rollers, corresponding grooves are provided in the drive shaft.

The device according to the invention is not only distinguished by light weight symbol carriers, the effortless moving of which is possible by means of weak signal impulses, but in addition, the invention provides the possibility to set up multidigit devices with simply constructed elements repeated in each digit place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a top plan view of the device according to line II—II in FIG. 1,

FIG. 3 is a section through the device along line III—III in FIG. 1, and

FIG. 4 is a part of the switching layout that may be used.

DESCRIPTION OF THE PREFERRED EMBODIMENTS

Figure 1:
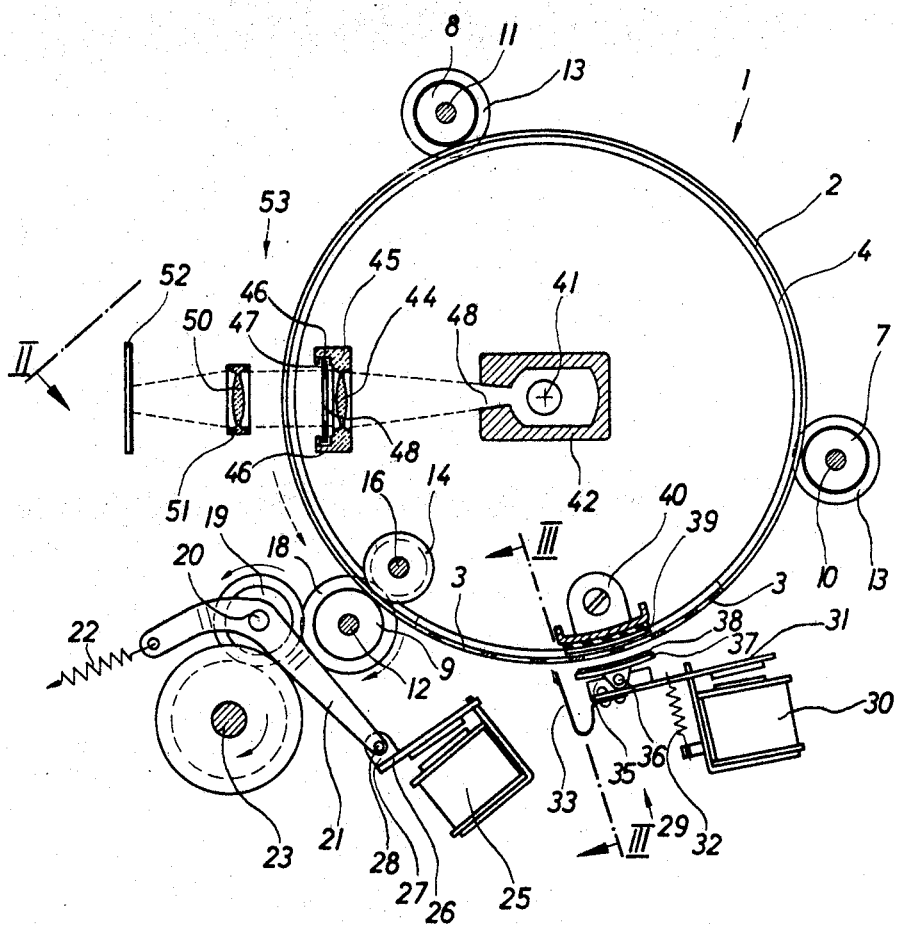
FIG. 1 is a sectional view through the device along line I—I of FIG. 2.

FIG. 1 shows in cross-section a symbol carrier 1, which is made in the form of a thin hollow cylinder. It consists of a cylinder 2 and a film 4, which carries the symbols to be shown in the form of transparent lines 5 (see FIGURE 2). The symbols may be applied to the film by a phototechnical or photographic process or by a printing process.

In the cylinder 2, which may be one piece, and for example a tube made of thin sheet steel, openings 3 for the symbols are provided. The film 4 is so affixed to the inner wall of the cylinder 2, that the symbols lie behind the openings 3. The film can advantageously be glued to the inner wall of cylinder 2. The symbol carrier 1 is additionally provided with synchronization marks 6 for the control of a switching device (not shown).

The symbol carrier 1 is borne on freely rotating rollers 7, 8 and 9, which normally are placed at an angle of 120° to each other outside the symbol carrier 1 on frame fitted stationary shafts 10, 11 and 12 fixed to the base frame. Without changing anything in the essence of the invention, freely rotatable rollers 7, 8 and 9 instead may be situated inside sign carrier 1. Roller 9 functions as the driving roller, cooperating with freely rotatable counter roller 14 situated on a frame fitted stationary shaft 16 inside sign carrier 1 in the example.

Counter roller 14 has, as shown in FIG. 2, two curved roller flanges 15, 15 between which the film 4 runs.

The bearing rollers 7 and 8 and the driving roller 9 for the symbol device 1 are arranged in a multiple digit symbol arrangement, as can be seen from FIG. 2, on shafts 10, 11, and 12 fixed in the frame together with the disks 13 and 18. The disks 13 are tapered slightly at their rims and serve symbol device 1 as spacer and guide disks. Disks 18 are shaped flat and act in addition also as spacer and guide disks for counter rollers 14.

Driving roller 9 lies at a certain distance opposite the continuously turning drive shaft 23. For selected time periods driving roller 9 can be coupled to the drive shaft 23 by means of coupling rollers 19 which may be engaged. For this purpose coupling roller 19 is carried on angled control lever 21 on rotary mounting stud 20. One of the ends of lever 21 connected with armature 26 of clutch magnet 25 via pin 28 and a right-angle lip 27, while the other end is connected to clutch spring 22.

Tension spring 22 continuously presses clutch roller 19 against drive shaft 23, so that roller 19 and shaft 23 rotate continuously in the embodiment shown in the drawing. Coupling between drive shaft 23 and the driven roller 9 therefore can be accomplished with an extremely small travel of the clutch magnet 25 assembly, since the clutch roller 19, as a consequence of the curvature of driving shaft 23 also approaches its respective driving roller 9. The drive shaft 23 is provided with grooves 24 for guiding clutch rollers 19.

In FIG. 1 clutch magnet 25 is not energized. Clutch roller 19 is continuously drivingly engaged by groove 24 of drive shaft 23. As soon as clutch magnet 25 is energized, clutch roller 19 contacts driven roller 9, so that throughout the energization of clutch magnet 25, a rotary input is applied to symbol carrier 1.

To stop symbol carrier 1 a braking device 29 is provided. In the model shown in the drawing, it consists of a brake magnet 30 with an armature 31 influenced by braking spring 32. At an angled portion 35 of armature 31, hinged brake shoe 37 is mounted by means on stud 36, and brake shoe 37 carries brake lining 38. Armature 31 is further provided with stop spring 33, which is shown in detail in FIG. 3. Stop spring 33 carries a shoulder 34. When braking magnet 30 is energized, shoulder 34 engages an opening 3 in cylinder 2 of symbol carrier 1 lying above, and, in cooperation with brake lining 38, stops the same in exactly the desired position in which it remains until braking magnet 30 is deenergized. Provision of shoulder 34 on stop spring 33 prevents excessive penetration into opening 3 and consequent destruction of film 4.

To aid in the braking operation, a support 40, with supporting surface 39, lies opposite brake lining 38.

Braking magnet 30 and clutch magnet 25 are electrically interconnected so that they can be mutually oppositely controlled.

In a multidigit assembly according to FIG. 2, a coupling device 19, 21, 23 and 25 and a braking device 29 are provided for each symbol carrier, together with a respective set of bearing and drive rollers 7, 8 and 9. All these parts, namely the bearing and drive rollers 7, 8 and 9 as well as the parts of the clutch, 19, 21, 23, 25 and the brake device 29 are arranged laterally to each other, in a mutually aligned serial order.

Multiple digit symbol devices may be constructed rapidly and very simply from the same, continually repeated parts. Manufacture, provisioning, and servicing are thereby greatly simplified. A further advantage is that the symbol carriers 1 need only the previously mentioned synchronization marks in addition to the transparent lines 5 for the symbols.

FIG. 4 shows in detail how a clutch magnet 25 and a braking magnet 30 are designed. Coupling magnet 25 and the braking magnet 30 are combined to form a bistable switching assembly 54. This is an advantage when the clutch magnet 25 and the braking magnet 30 are switched as the stages of a magnetic flip-flop 55. FIG. 4 shows the coils of magnets 25 and 30 arranged on a magnet yoke 56. The coils are connected through amplifiers 57 to the outputs of flip-flop 58 having a first connection 59 and a second connection 60. The bistable switching assembly 54 can be controlled by a conventional switching device well known in the art so that armature 61 of the magnetic flip-flop 55 is pulled either to its left or its right position. Connected to armature 61 are coupling roller 19 on one side, and brake lining 38 and stop spring 33 on the other side. The function of the switching device is essentially to control symbol carrier 1 with the help of the clutch and braking devices timed so that the symbol carrier 1 is set in motion when a symbol is to be shown and is stopped when the symbol appears in the field of view.

FIGURES 1 and 2 show that inside the adjacent symbol carriers a light source 41 is provided, which together with an optical system generally designated at 53, serves for the displaying of each selected symbol in turn. In the drawing of the model, light source 41 is planned as a tubular lamp and placed inside a reflector 42, which can be mirrored inside. Opening 43 of reflector 42 is directed toward the symbol to be selected.

Included in optical system 53 are a first lens 44 arranged inside symbol carrier 1 and a second lens 50 situated outside symbol carrier 1. The lenses 44 and 50 advantageously may be formed out of a single strip of plastic 45, 51 for all digits of a multidigit display device. This makes easier both the construction and servicing of multidigit display devices.

FIG. 1 shows guide slots in plastic strip 45 for the lenses 44 situated inside the symbol carrier 1. In these guide slots 46 a longitudially sliding slide 47 is provided, which is best seen in FIG. 2. In slide 47 openings 48 are provided in proper locations. When symbol carrier 1 is at rest, openings 48 allow light from opening 43 to project through the symbol that has been put into place. In FIG. 2 slide 47 is provided with a connection hole 49, at which a slide drive (not shown) can act on slide 47. In an extremely simple (not shown) case, slide 47 can be so connected to braking device 29 that at each energization of braking magnet 30 slides slide 47 so that the openings 48 stand in front of lenses 44. When braking magnet 30 is de-energized, slide 47 may be pushed so that no light can escape outwardly during the preparatory phase of the symbol carrier. The symbols slid into position are normally readily recognizable. In the drawing of the model, however, a screen 52 is shown as part of the optical system 53, on which the symbols can be made visible. Screen 52 may be constructed from a sheet of ground glass.

With a single slide 47 provided, the symbol strips must show, at least at one spot on their circumference, a "zero" or a blank field. Each symbol strip not intended to display a symbol at a given time, must be turned to display its blank field. If a zero is desired to be shown, then the symbol strip must, of course, be positioned to display the zero.

It will be understood that each of the elements described above, or two or more together, may also find a useful application in other types of optical symbol display apparatus differing from the types described above.

The invention is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. Optical symbol display apparatus, comprising, in combination: a rotating symbol carrier comprising a thin-walled hollow cylinder adapted to rotate about a first axis and provided with a sequence of light-transmissive symbols spaced about its circumference; a light source situated within said cylinder and adapted to direct light outwardly from said cylinder through successive ones of said symbols as said carrier is rotated; a plurality of bearing roller means spaced about the periphery of said cylinder on one side of the wall of said cylinder to support said cylinder for rotation about said first axis; a counter roller means radially spaced from one of said bearing roller means on the opposite side of said wall of said cylinder whereby said cylinder is gripped between said one of said bearing roller means and said counter roller means; and means for rotating said one of said bearing roller means to rotate said cylinder.

2. Apparatus according to claim 1 in which each of said roller means has a length approximating the axial length of said cylinder and a smooth exterior surface which engages said cylinder.

3. Apparatus according to claim 1 in which at least one of said roller means includes disc means situated adjacent opposite ends of said cylinder to limit axial movement of said cylinder.

4. Apparatus according to claim 1 in which said means for rotating said one of said bearing roller means comprising a continuously-rotating drive means and means for intermittently coupling said drive means to said one of said bearing roller means, said apparatus including a braking device adapted to frictionally engage said cylinder, and means for disabling said braking device when said drive means is coupled to said one of said roller means.

5. Apparatus according to claim 1 in which said means for rotating said one of said roller means comprises a continuously-rotating drive means, a coupling roller carried on a movable arm, spring means normally urging said coupling roller into frictional engagement with said drive means, and magnet means for moving said arm so that said coupling roller engages both said drive means and said one of said roller means.

6. Optical symbol display apparatus for providing a multi-character data display of alphanumeric information, comprising, in combination: a multplicity of thin-walled hollow cylinders each provided with a sequence of light-transmissive symbol spaced about its circumference, said hollow cylinders all being mounted laterally adjacent to each other to rotate about a common axis; a light source extending within each of said cylinders and adapted to direct light outwardly from said cylinders through various of said symbols as said cylinders are rotated to various angular positions about said axis; a plurality of bearing roller means spaced about the periphery of each of said cylinders on one side of the wall of each of said cylinders to support each of said cylinders for rotation about said axis, a multiplicity of drive means for individually rotating respectve ones of the bearing roller means supporting said cylinders to rotate each of said cylinders independently of the rotation of the other of said cylinders, and a multiplicity of counter roller means each spaced on the opposite side of the wall of a respective one of said cylinders in a radial direction from one of said bearing roller means.

8. Apparatus according to claim 6 in which each of said bearing roller means has a length approximating the axial length of the cylinder which it supports and a smooth exterior surface which engages the cylinder which it supports.

9. Apparatus according to claim 6 having disc means extending between the ends of adjacent pairs of said cylinders to limit axial movement of said pairs of cylinders.

10. Apparatus according to claim 6 having a plurality of fixed shafts extending parallel to said axis past said multiplicity of cylinders, each of said fixed shafts rotatably supporting a respective group of said bearing roller means, each of said bearing roller means of a given group supporting a different one of said cylinders.

11. Apparatus according to claim 6 in which said multiplicity of drive means comprise a multiplicity of coupling rollers and said apparatus includes a continuously-rotating drive shaft, each of said coupling rollers being translatable between a first position coupling said drive shaft to a respective one of said bearing roller means to rotate a respective one of said cylinders and a second position disengaging said respective one of said bearing roller means.

12. Apparatus according to claim 6 having a multiplicity of braking means for independently braking individual ones of said cylinders, each of said braking means comprising a fixed pad mounted adjacent the inside surface of a cylinder and movable pad spaced radially from the fixed pad adjacent the outside surface of the cylinder and means for moving each of said movable pads independently to frictionally engage and disengage a respective cylinder.

13. Apparatus according to claim 6 having a multiplicity of braking means for independently braking individual ones of said cylinders and a multiplicty of bistable switching circuits, each of said bistable switching circuits being connected to oppositely actuate the drive means and the braking means associated with a given one of said cylinders.

14. Apparatus according to claim 1 in which said thin-walled hollow cylinder includes a sequence of apertures spaced about its circumference and a film bearing said symbols affixed to the inside wall of said cylinder with each of said symbols registering with a respective one of said apertures.

15. Apparatus according to claim 7 having a movable shutter means extending inside each of said cylinders and movable parallel to said axis.

16. Apparatus according to claim 11 in which said drive shaft has a multiplicity of shoulders to determine the axial position of each of said coupling rollers.

17. Apparatus according to claim 12 in which each of said cylinders includes a sequence of recesses spaced circumferentially around each cylinder, and in which each of said braking means includes spring means attached to a movable pad to engage the recesses of its respective cylinder to act as a detent.

18. Apparatus according to claim 12 in which said spring means includes a shoulder to limit the depth of engagement of the spring means into said recesses.

19. Apparatus according to claim 12 having a movable shutter means extending inside each of said cylinders and movable parallel to said axis, and means for synchronizing said shutter means with said multiplicity of braking means.

20. Apparatus according to claim 3 in which said disc means comprises a pair of flanges on opposite ends of one of said roller means.

References Cited

UNITED STATES PATENTS

| | | | |
|---|---|---|---|
| 2,289,812 | 7/1942 | Tuttle et al. | 353—90 |
| 2,472,931 | 6/1949 | Yohn | 355—23 |
| 2,737,883 | 3/1956 | Crawford | 101—93 |
| 2,796,009 | 6/1957 | Boyle et al. | 95—125 |

NORTON ANSHER, Primary Examiner

RICHARD L. MOSES, Assistant Examiner

U.S. Cl. X.R.

95—4.5